US006925530B2

(12) United States Patent
Busser et al.

(10) Patent No.: US 6,925,530 B2
(45) Date of Patent: Aug. 2, 2005

(54) INITIALIZATION OF A STORAGE SYSTEM

(75) Inventors: Richard W. Busser, Longmont, CO (US); Ian R. Davies, Longmont, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 506 days.

(21) Appl. No.: 09/942,391

(22) Filed: Aug. 29, 2001

(65) Prior Publication Data

US 2003/0046490 A1 Mar. 6, 2003

(51) Int. Cl.[7] .................................... G06F 12/00
(52) U.S. Cl. .................................... 711/114
(58) Field of Search .................................... 711/114; 710/10

(56) References Cited

U.S. PATENT DOCUMENTS 5,657,468 A * 8/1997 Stallmo et al. ............. 711/114
5,943,689 A 8/1999 Tamer ............. 711/166
6,425,053 B1 * 7/2002 Considine et al. ............. 711/114
6,502,169 B1 * 12/2002 Noya ............. 711/138
6,665,743 B2 * 12/2003 Benhase et al. ............. 710/10
6,697,913 B1 * 2/2004 Hansen et al. ............. 711/112

OTHER PUBLICATIONS

Paul Massiglia, The RAID handbook, A Storega System Technology Handbook, Feb. 1997, RAID Advisory Board, 6th edition, p. 84.*

* cited by examiner

*Primary Examiner*—Matthew Kim
*Assistant Examiner*—Woo H. Choi
(74) *Attorney, Agent, or Firm*—Sheridan Ross, P.C.

(57) ABSTRACT

A storage array comprised of a number of storage drives is provided with a controller to control zero initialization of the storage drives. The zero initialization involves writing zeros to all the storage drives in the array before user data or other information is written thereto. Each storage drive has a priority associated with accessing and using a bus subsystem that provides the communication link between the array of storage drives and the controller. A number of write operations are conducted during the zero initialization process to each storage drive in the array. A first write operation is performed by each storage drive before a second write operation is performed. Substantially equal usage of the bus subsystem by all the storage drives in the array is achieved in order to fully utilize the available bandwidth of the bus subsystem and reduce the time required to complete the zero initialization.

20 Claims, 3 Drawing Sheets

INITIALIZATION OF A STORAGE SYSTEM

FIELD OF THE INVENTION

The present invention relates to initialization of a fault tolerant storage array and, in particular, to managing writes to the array during initialization.

BACKGROUND OF THE INVENTION

Storage systems enable data and other information to be stored for access by the user. Storage systems include fault tolerant arrays comprised of a number of storage devices, such as disk or tape drives. To insure accuracy of information to be stored or written to the array of storage drives, it is common to initialize the array before the user's data is written to it.

One known way to initialize a storage array is to write zeros to all stripes of the entire storage array. Another known method involves generating parity data for the existing data currently stored on the storage drives. This latter method is identified as a "scrub". In conducting either of these two initialization methods, significant time is required and, during this time, the user is typically prevented from using the storage array until the initialization process is finished.

With respect to allowing access to the storage array before the initialization is complete, it is known to employ "sure writes" to the storage array that is being scrubbed. In using sure writes, a scrub of the stripe being written must be made before writing the new data to that stripe. This method is slower than using the zero initialization method because the accesses to the storage drives must wait for the parity data to be generated, which involves a number of exclusive or (XOR) operations. Each storage drive is issued a mix of reads and writes and this slows down the initialization process even more. Consequently, it is difficult for the storage drives to optimize access to their storage media. Another disadvantage to using sure writes is that overall system performance becomes lower because resources are being used to implement the XORs.

Because of the drawbacks associated with sure writes, the zero initialization method is preferred. However, it is necessary to devise and implement a procedure by which the storage drives write more efficiently and quickly to their storage media. In that regard, it is noted that storage drives can function more efficiently if they are issued a sufficient number of write commands so that a suitable number of write commands are queued at each of the drives. When one write operation is finished based on one write command, another write operation can immediately be conducted based on the next, queued write command.

Storage drives in the array can be subject to a priority scheme. For example, in using a SCSI bus, each storage device has a SCSI identifier with an assigned priority vis a vis the other drives on this SCSI bus. The higher priority storage drives connected to the same bus have preferred or higher priority access to the bus and will not equally, or substantially equally, share the bus during a zero initialization. The lower priority storage drives will have infrequent ownership of or access to the bus. This results in the higher priority drives finishing their initialization sooner than lower priority drives. When the higher priority drives have finished, only then will the lower priority drives be able to finish. This means that at the end of a zero initialization only a few storage drives will be writing and all other storage drives will be finished. A high bandwidth drive channel is not fully utilized when only a few storage drives are using it. As a consequence, in conducting such a zero initialization, it would take longer and, therefore, is inefficient.

It would be beneficial to initialize a storage array in a reduced amount of time so that the user can more quickly use the storage array in connection with performing write operations. In doing this, it would be advantageous to fully employ the available high bandwidth during all times that the initialization is being performed.

SUMMARY OF THE INVENTION

In accordance with the present invention, method and apparatus are provided to optimize utilization of the high bandwidth bus subsystem during the time that zero initialization of a fault tolerant storage array is being conducted.

The apparatus for initialization of the storage array includes an array of drives for storing information including data. In one embodiment, each of a number of storage drives in the array is a disk drive that has disk or storage media. A bus subsystem is connected to the array of storage drives having a protocol for use in sending commands and carrying data and other information between the array of drives and a controller. In one embodiment, the bus subsystem includes one or more SCSI (small computer system interface) buses connected to a number of disk drives.

Each storage drive has a priority that relates to its ability to access and use the bus subsystem, such as including one or more SCSI buses, in preference to, or priority over, other storage drives connected to the bus subsystem. With respect to the SCSI bus and the number of storage drives connected thereto, a first storage drive has a higher priority than a second storage drive and the second storage drive has a higher priority than a third storage drive and so forth. This results from the fact that each storage device (e.g., disk drive) connected to a SCSI bus has a unique identifier associated with it and the identifier determines the relative priority on the bus.

The controller, which is in communication with the array of drives using the bus subsystem, controls, among other things, write operations to the array of drives. Relatedly, the controller is involved with controlling the initialization of the array of drives. More than one controller could be in communication with the array of storage drives, although in performing the initialization process, only one controller need be utilized.

The bus subsystem, such as including the one or more SCSI buses, has a predetermined bandwidth associated with the amount of data or other information that can be transported at any one time between the array of drives and the controller using the bus subsystem. During the time that the zero initialization of the array of drives is being performed, optimum utilization of the available bandwidth is sought. In particular, in order to avoid underutilization of one or more storage drives during the zero initialization process, the controller is involved with making sure that the bus subsystem is shared equally, or substantially equally, by all storage drives of the array. Preferably, this can be accomplished by controlling write operations to all storage drives in the array such that the zero initialization is performed on all drives in the array substantially continuously, and not a zero initialization of one or some of the storage drives and then a zero initialization of other storage drives in the array. This can be achieved by the controller controlling the manner by which a number of write operations are conducted, which involves writing zeros to each of the storage drives. That is, a first write related operation is completed to each of the storage drives in the array before a second write related operation for all the storage drives in the array is performed. Given that there are lower priority storage drives in the array, zero writes associated with the first write related operation are performed before higher priority storage drives are permitted to perform zero writes associated with a second write related operation. In one embodiment, these write related operations involve writing to at least one range of one or more LBAs (logical block addresses) associated with the storage drives of the array. A range of LBAs is a set or a number of logical block addresses that can be sequential addresses. In a preferred embodiment, a predetermined number of write commands associated with write related operations are issued to each of the drives in the array to start the initialization process. After that, each time such a write related operation is completed, another write related operation is issued. Preferably, the predetermined number is at least four and each write related operation is associated with one or more logical block addresses. Although a different number of write operations than four could be used, four write operations are expected to be sufficient to effectively and efficiently service each of the storage drives so that at least four write related operations are continuously maintained or queued at the storage drives.

With regard to initializing an array of storage drives, all the storage drives in the array can have substantially equal usage, or a better opportunity exists for more equal utilization, of the bus subsystem while a zero initialization process is being performed. A predetermined number of write related operations are issued for one or more ranges of LBAs associated with each of the drives in the array. One or more additional write related operations are issued after each drive has completed its write related operation(s) for at least any one outstanding (previously provided) range of one or more LBAs. By way of example only, the number of LBAs ranges can be four. When all drives in the array have completed their write related operation(s), for at least one of the four ranges, another write related operation is issued for a fifth LBA range to all drives.

Based on the foregoing, a number of aspects of the present invention are immediately recognized. An optimal zero initialization of a storage array is provided. The present invention enhances use of the high bandwidth associated with the bus and drive channels of the storage system. The present invention takes into account, overcomes or otherwise is used in controlling priority issues associated with the storage drives, such as when the storage drives are connected to a SCSI bus and each storage drive has a priority or preference associated with it. Accordingly, the present invention makes sure that all storage drives have substantially equal access to the bus and, preferably, this can be implemented by queuing a sufficient number of write commands with each of the drives and only issuing one or more additional commands after at least one outstanding write operation is completed for all drives in the array.

Additional advantages of the present invention will become readily apparent from the following discussion, particularly when taken together with the accompanying drawings.

DETAILED DESCRIPTION

Various types of storage units are used in current data processing systems. A typical system may include one or more large capacity tape units and/or disk drives connected to the system through respective control units for storing data. However, a problem exists if one of the storage units fails such that information contained in that unit is no longer available to the system. Generally, such a failure will shut down the entire computer system, which can create a problem for systems which require high availability.

This problem has been overcome to a large extent by the use of Redundant Arrays of Independent Disks (RAID) systems. RAID systems are widely known, and several different levels of RAID architecture exist, including RAID 1 through RAID 5, which are also widely known. A key feature of a RAID system is redundancy, which is achieved through the storage of data over several disk drives and parity information stored on one or more drives.

Figure 1:
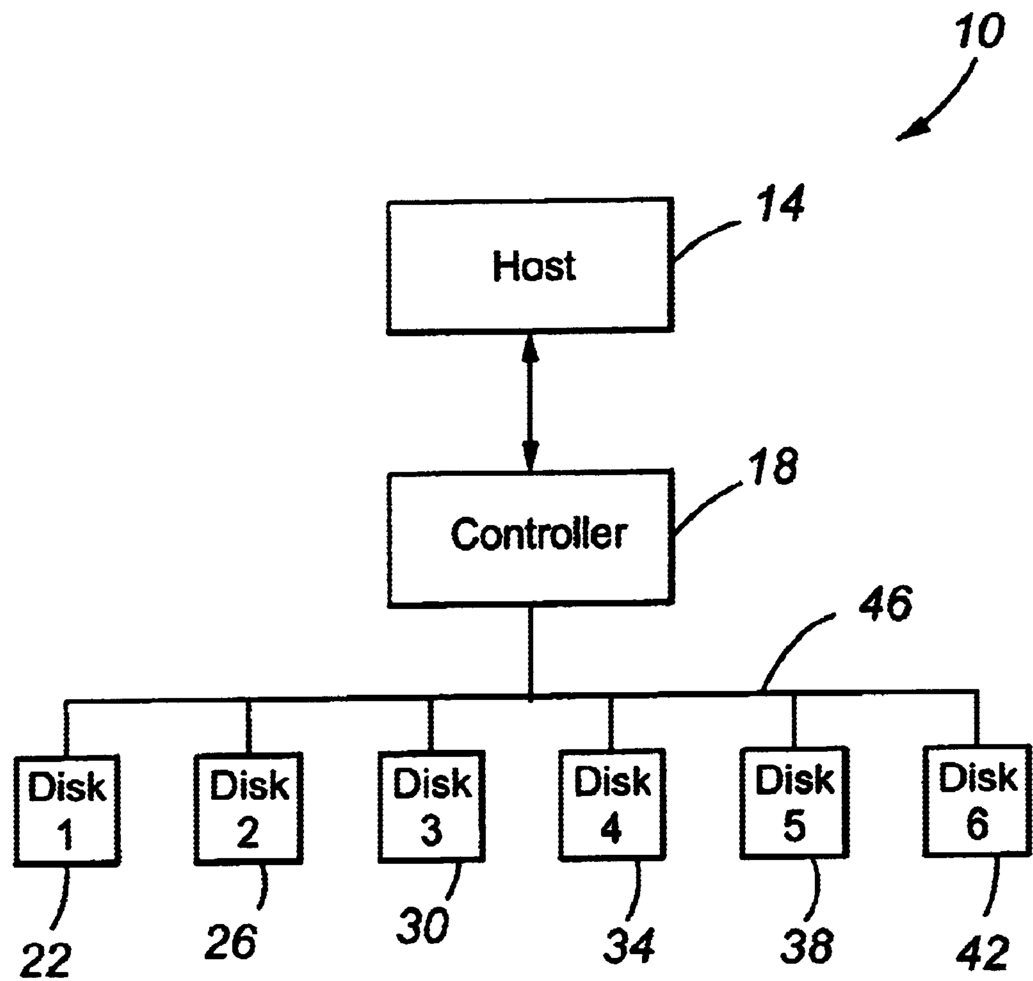
FIG. 1 is a block diagram of a conventional prior art storage system connected to a host or user machine.

With reference to FIG. 1, a typical RAID system 10 includes a host computer 14, at least one controller 18, and a number of disk drives 22, 26, 30, 34, 38, 42. It should be understood that the number of drives shown in FIG. 1 are for the purpose of discussion only, and that a RAID system may contain more or fewer disk drives than shown in FIG. 1. Data is written to the drives 22, 26, 30, 34, 38, 42 in such a way that if one drive fails, the controller 18 can recover the data written to the array. How this redundancy is accomplished depends upon the level of RAID architecture used, and is well known in the art. The disk drives 22, 26, 30, 34, 38, 42 are connected to the controller 18 via a bus connection 46.

The controller 18 is connected to the host computer 14, which communicates with the controller 18 as if it were communicating to a single drive or other storage unit. Thus, the RAID system appears to the host computer 14 as a single storage drive. The controller 18 receives read and write commands, and performs the appropriate functions required to read and write data to the disk drives 22, 26, 30, 34, 38, 42 depending upon the RAID level of the system. Typically, when the host computer 14 issues a write command, the controller 18 receives this command and stores the data to be written in a memory location, and sends a reply to the host computer 14 that the write is complete. Thus, even though the data may not have been written to the disk drives 22, 26, 30, 34, 38, 42, the host computer 14 is notified that it has been written. The controller 18 then takes appropriate steps to process and store the data on the disk drives 22, 26, 30, 34, 38, 42.

Figure 2:
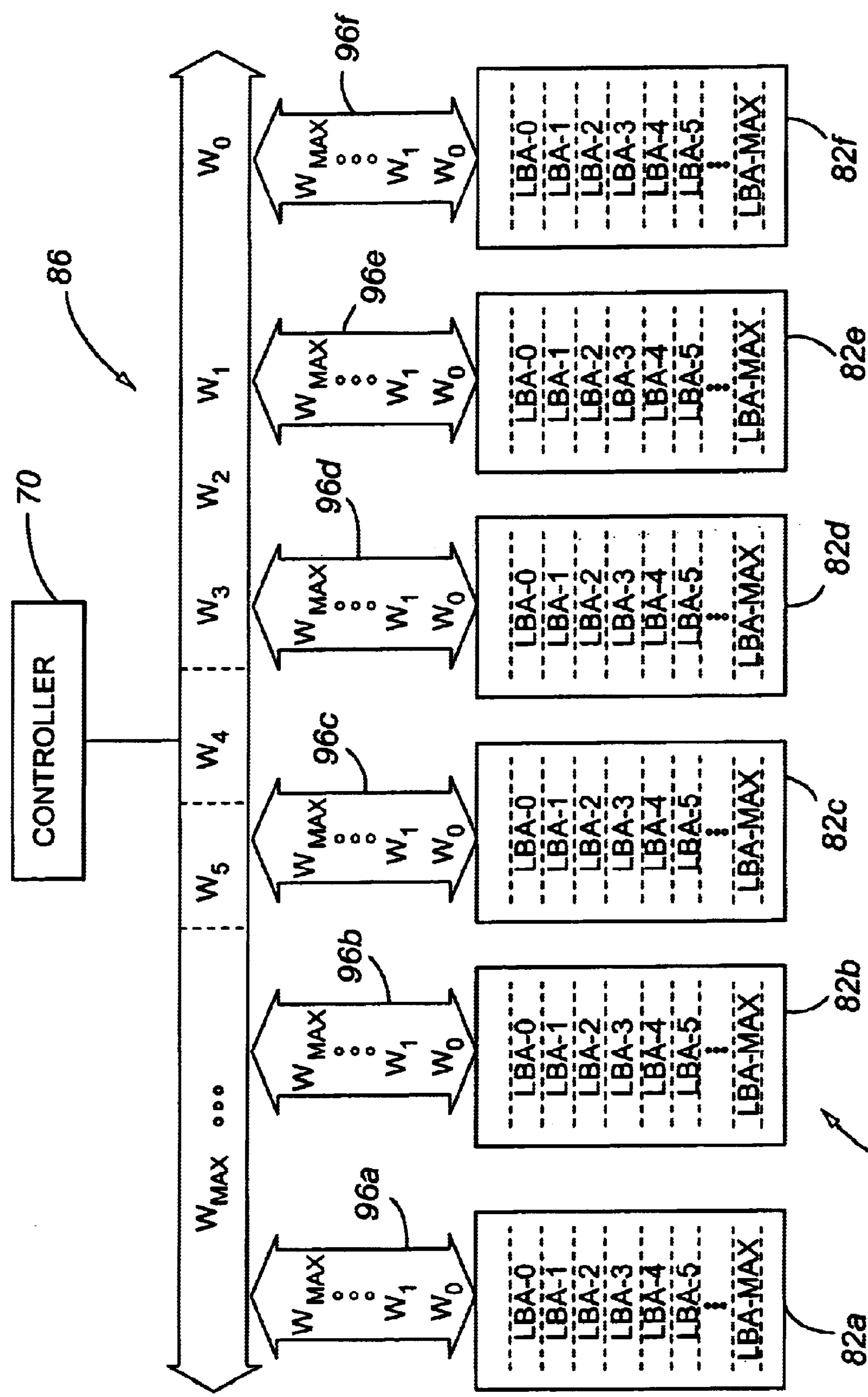
FIG. 2 schematically illustrates the bus subsystem and storage drives of the present invention in which a number of write related operations are performed during a zero initialization process.
Figure 3:
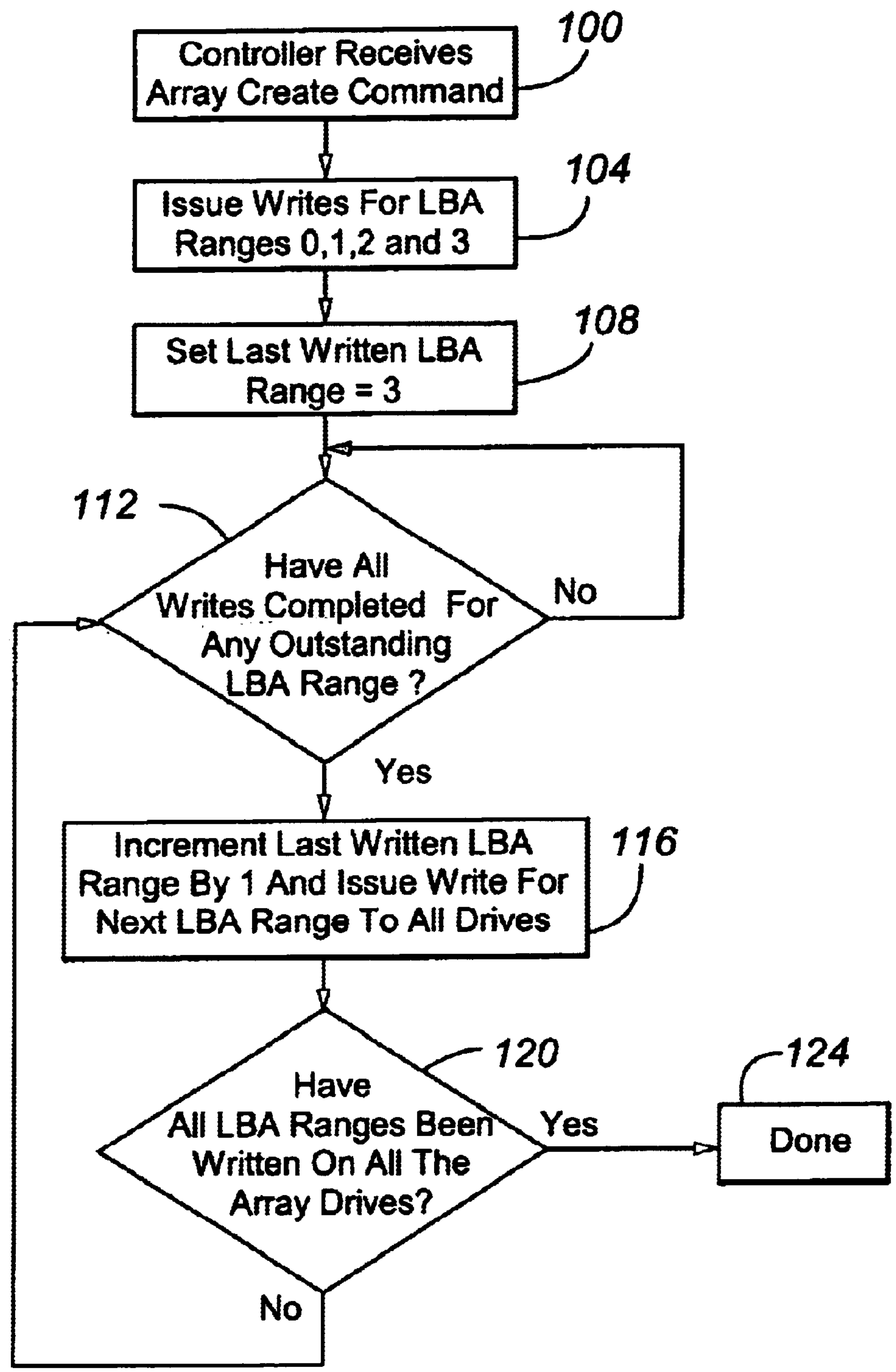
FIG. 3 is a flow diagram related to conducting write operations during the zero initialization process.

With reference to FIG. 2, a zero initialization RAID system is next described according to the present invention. FIG. 3 illustrates a controller 70 having program memory that stores software or program instructions that are executable for implementing the zero initialization process. The controller 70 communicates with a storage array 78 having a number of storage drives 82, such as drives 82_a_–82_f_. The controller 70 controls read operations and write operations pursuant to commands from one or more hosts. The bus subsystem 86 provides the communication path between the controller 70 and the storage array 78. The bus subsystem 86 can include a number of drive channels 96, such as drive channels 96_a_–96_f_. Each of the drive channels 96_a_–96_f_ is connected to, and acts as a communication link between, the controller 70 and the drives 82 of the storage array 78.

As represented in FIG. 2, the controller 70, during the zero initialization process, issues a number of write related operations or writes, namely writes $W_0$, $W_1$, $W_2$, $W_3$, $W_4$ . . . $W_{max}$ (indicative of the maximum number of writes or the last write that is performed in the zero initialization). Each of the writes is for a range of LBAs for all the drives 82*a*–82*f* in the array. Each of the writes $W_0$ . . . $W_{max}$ can be associated with one such write related operation. For example, the write or write related operation $W_0$ involves writing all zeroes to the logical block addresses associated with LBA range 0 that is found on each of the drives 82 of the storage array 78.

In conjunction with performing the zero initialization, it is advantageous to fully utilize the available bandwidth of the bus subsystem 86 including that associated with the drive channels 96. It is beneficial to fully utilize its high bandwidth capabilities by the controller 70 issuing a sufficient number of writes or write commands that keep the bus subsystem 86 busy. Utilizing the bandwidth capabilities of the bus subsystem 86, therefore, involves making sure that write operations for writing zeroes on all of the drives of the array are provided substantially continuously, or all the time the zero initialization is being performed. Stated differently, essentially no drive in the array is able to perform zero writes while another drive must wait a substantial time to perform its zero writes, where such waiting would result in one or more drives being finished with their zero writes a substantial time before one or more other drives finish with their zero writes. Such a substantial time would be related to inefficient use of the bus subsystem 86. In a case of such a substantial time difference, the bus subsystem 86 might be under-utilized, particularly such as near the end of the zero initialization process where the highest priority drive is finished well before the other drives. For example, the highest priority drive may be finished with its initialization 30%–50% faster than the next highest priority drive. In such a case, the lowest priority drive may take as much as 1.5–2 times as long as the highest priority drive to complete its initialization. In a preferred embodiment, each zero write is performed for at least one LBA range for each of the drives in the array before the next zero writes can be conducted for the next sequential LBA range. This results in all drives within the array finishing their initialization at essentially the same time.

As noted, the bus subsystem 86 can have a protocol that includes different priorities being assigned to the drives 82 connected to it. A high priority drive can monopolize the bus subsystem 86 whereby the higher priority drive occupies the bus subsystem 86 to fill its requirements first. In such a case, lower priority drives would be forced to wait for access to the bus subsystem 86 until after the higher priority drive is finished or relinquishes its ownership of the bus subsystem 86. In the embodiment of FIG. 3, the storage drive 82*a* is considered to have a higher priority than the second drive 82*b*, which has a higher priority than the third storage drive 82*c*, and so forth, wherein the storage drive 82*f* has the lowest priority and the storage drive 82*a* has the highest priority. It is worthwhile, therefore, to control or handle the different priorities of the storage drives 82 so that the available bandwidth associated with the bus subsystem 86 provides equal, or substantially equal, access to the bus subsystem 86 during essentially all the time that the zero initialization process of the storage array 78 is being conducted. To accomplish this, bus utilization is controlled by controlling issuance of writes or write related operations, particularly using the software instructions stored in the program memory 74. Relatedly, as part of controlling bus utilization, it is appropriate to issue a sufficient or suitable number of writes that are to be acted on by the storage drives 82 in the array. When a sufficient number of writes are maintained, the drives 82 operate efficiently and productively in completing the zero writes as rapidly as they can and are not waiting for other operations or components during the zero initialization process. In one embodiment, it is preferred that at all times during the zero initialization process four (4) writes be issued and be made available to the storage array drives 82.

Referring now to FIG. 3, the zero initialization process and the steps associated therewith are next described. At block 100, an initialization is to be performed, such as by the controller 70 receiving an array create command from a host. After receiving this command, the controller 70 issues a predetermined or desired number of write related operations or writes that are to be sent to the storage array 70 using the bus subsystem 86 noted by block 104. According to one embodiment, the predetermined number of writes that are issued is four and each of the four writes is to be used in writing zeros to different logical block address ranges, such as LBA ranges 0, 1, 2, 3. Relatedly, in conjunction with issuing the four writes to provide desired queuing of writes at the storage drives 82, if not previously provided, this predetermined number of writes is set or otherwise identified at block 108, such as setting the last written LBA range to be equal to three (3).

With the issuance of the four writes to the storage array 78, all drives 82 in the storage array must complete zero writes for at least one outstanding LBA range (e.g., at least one of LBA ranges 0, 1, 2, 3) according to block 112. A check continues to be made at block 112 regarding whether or not all the array drives 82 have completed their writes to at least one outstanding LBA range, which writes continue until all writes have been completed for that one or more LBA range. For example, with regard to the writes for LBA range 0, first drive 82*a* having priority completes its zero writes to LBA range 0, then drive 82*b*, which is next in priority, completes its zero writes to LBA range 0, and so forth until drive 82*f* completes all its zero writes to LBA range 0.

Once writes for all drives 82 in the storage array 78 have been completed for LBA range 0, block 112 provides an affirmative answer so that the series of steps associated with block 116 are performed related to the controller 70 issuing one or more writes for the next logical block address range. In this case, with the last range having a write command issued being LBA range 3, the controller 70 issues writes for LBA range 4. That is, the last written LBA range is incremented by one (e.g., 3 is incremented to 4) and this next write related operation is issued to all the drives in the array. Due to the issuance of this next write for LBA range 4, the number of ranges of one or more logical block addresses in the queue to which zero writes are to be written remains the same, in this one example, at four. Furthermore, in accordance with block 112, zero writes are also now being directed to an outstanding LBA range, which may be LBA range 1 or another LBA range in the queue and which is associated with all the drives 82 in the storage array 78.

After issuing the writes for LBA range 4 at block 116, a determination is made at block 120 as to whether or not zeros have been written to all LBA ranges on all the drives in the particular array. If not, the steps associated with block 112 are continued including a check as to whether or not all writes have been completed for any outstanding or previously provided one or more LBA ranges. That check is continued until such writes are completed. Then the series of steps associated with block 116 are again implemented including incrementing the last written LBA range by one and issuing another write for the next LBA range to all drives. After the steps of block 116 are finished, the functions of block 120 are again conducted. If at this time all LBA ranges have been written on all the array drives, a decision is made at block 124 that the initialization is complete.

As can be appreciated, the procedure identified in FIG. 3 and described hereinabove is a representative example. Different procedures and/or steps could be devised to implement the zero writes while making sure that any drive priority does not affect the requirement of maintaining preferred bandwidth usage.

The foregoing discussion of the invention has been presented for purposes of illustration and description. Further, the description is not intended to limit the invention to the form disclosed herein. Consequently, variations and modifications commensurate with the above teachings that are within the skill and knowledge of the relevant art are within the scope of the present invention. The embodiments described hereinabove are intended to explain the best mode presently known of practicing the invention and to enable others skilled in the art to utilize the invention in such, or in other embodiments, and with the various modifications required by the particular application or uses of the invention. It is intended that the appended claims be construed to include alternative embodiments to the extent permitted by the prior art.

What is claimed is:

1. A method for initializing an array of drives, comprising:

providing an array of drives including a first drive and a second drive, a controller and a bus subsystem that enables communications between said controller and said array of drives, each of said drives being associated with a priority and with said first drive having greater priority than said second drive; and causing substantially equal usage of said bus subsystem by all of said drives while performing a zero initialization of said drives:

wherein said causing substantially equal usage of said bus subsystem includes:

issuing a number of write related operations to each of said drives in said array, wherein each of said number of write related operations issued to a one of said drives concerns a different logical block address range than any other of said number of write related operations issued to said one of said drives, wherein said number of write related operations are queued;

determining whether each of said drives has completed at least one of said number of write operations concerning at least one logical block address range, wherein each of said number of write operations is associated with more than one logical block address;

in response to determining that each of said drives has not completed at least one of said number of write operations concerning at least one logical block address range, deferring issuing at least one more write related operation and continuing said determining whether each of said drives has completed at least one of said number of write operations concerning at least one logical block address range; and in response to determining that each of said drives has completed at least one of said number of write operations concerning at least one logical block address range, issuing at least one more write related operation to each of said drives in said array.

2. A method, as claimed in claim 1, wherein:

said causing step includes providing write operations to all said drives of said array during substantially all the time said zero initialization of said drives is being performed.

3. A method, as claimed in claim 1, wherein:

said causing step includes controlling utilization of said bus subsystem independently of said priority.

4. A method, as claimed in claim 1, wherein:

said issuing a number of write related operations to each of said drives includes issuing a predetermined number of at least two write operations to said first drive and a predetermined number of at least two write operations to said second drive and in which subsequent issuing of another write operation to said first drive is made after at least one of said predetermined number of at least two write operations is completed by said second drive and after at least one of said predetermined number of at least two write operations is completed by said first drive.

5. A method, as claimed in claim 4, wherein:

said predetermined number of at least two write operations issued to said first drive relates to one or more ranges of logical block addresses (LBAs).

6. A method, as claimed in claim 4, wherein:

said predetermined number of at least two write operations is four.

7. A method, as claimed in claim 5, wherein:

said causing step includes checking whether a write operation for at least one of said one or more ranges of LBAs has been completed to each of said drives of said array.

8. A method, as claimed in claim 7, wherein:

said causing step includes issuing a write operation for a next one or more LBA ranges to be written to each of said drives of said array.

9. An apparatus for initializing an array of drives, comprising:

an array of drives for storing information, said array of drives including at least a first drive and a second drive with said first drive being associated with a higher priority than said second drive, wherein each of said drives in said array is associated with a queue operable to store a number of write commands;

a bus subsystem connected to said array of drives; and a controller in communication with said array of drives using said bus subsystem, said controller for controlling issuance of write operations to each drive within said array, wherein after an initial set of write operations is issued to each of said drives within said array, an additional, write operation is not issued to each of said drives in said array until at least one write operation included in said initial set of write operations has been completed on each of said drives, and wherein each of said write operations in said initial set relates to a logical block address range that comprises more than one logical block address.

10. An apparatus, as claimed in claim 9, wherein:

said bus subsystem is shred substantially equally by all said drives of said array when said controller controls said first and second write operations.

11. An apparatus, as claimed in claim 9, wherein:

said write operations are implemented by all of said drives substantially continuously in order to initialize said drives of said array.

12. An apparatus, as claimed in claim 9, wherein:

said controller controls a predetermined number of at least one write operation to at least said first and second drives and with said predetermined number of at least one write operation to said first and second drives being controlled before issuance of at least said second write operation.

13. An apparatus, as claimed in claim 12, wherein:

said predetermined number relates to one or more ranges of logical block addresses (LBAs).

14. A method, as claimed in claim 12, wherein:

said predetermined number is at least four.

15. An apparatus, as claimed in claim 13, wherein:

said controller checks whether one write operation is completed for at least one of said ranges of said LBAs to each of said drives of said array.

16. An apparatus, as claimed iii claim 15, wherein:

said controller issues a next write operation to each of said drives of said may for a next range of LBAs after a determination is made that said one write operation is completed for said at least one LBA range.

17. An apparatus, as claimed in claim 9, wherein:

said first drive has the highest priority and said second drive has the lowest priority of said drives of said array and said write operations are used to zero initialize said drives.

18. A method for initializing an array of storage devices, comprising:

receiving a command to initialize a storage array, wherein said storage array includes a number of storage devices;

issuing at least first and second write related operations to each of said storage devices in said array, wherein said first write related operation concerns a first logical block address range and said second write related operation concerns a second logical block address range; and only in response to determining that every one of said storage devices included in said storage array has completed at least one of said at least first and second write related operations, issuing an additional write related operation to every one of said storage devices in said storage array, wherein said additional write related operation concerns a logical block address range not included in said first logical block address range or said second logical block address range, and wherein said logical block address ranges each comprise more than one logical block address.

19. The method of claim 18, wherein said issuing at least first and second write related operations comprises issuing first, second, third and fourth write related operations, wherein said first write related operation concerns a first logical block address range, wherein said second write related operation concerns a second logical block address range, wherein said third write related operation concerns a third logical block address range, wherein said fourth write related operation concerns a fourth logical block address range, wherein said additional write related operation comprises a fifth write related operation, end wherein said fifth write related operation concerns a fifth logical block address range.

20. The method of claim 18, further comprising:

placing at least one of said issued at least first and second write related operations for each of said storage devices in a command queue.

* * * * *

UNITED STATES PATENT AND TRADEMARK OFFICE

CERTIFICATE OF CORRECTION

PATENT NO. : 6,925,530 B2
APPLICATION NO. : 09/942391
DATED : August 2, 2005
INVENTOR(S) : Richard W. Busser and Ian R. Davies It is certified that error appears in the above-identified patent and that said Letters Patent is hereby corrected as shown below:

In the Claims:

Claim 10, line 61: “An apparatus, as claimed in claim 9, wherein:
said bus subsystem is shred substantially equal...”

Replace “shred” with “shared”

Claim 16, line 18: “An apparatus, as claimed iii claim 15, wherein...”

Replace “iii” with “in”

Claim 16, line 20: “...drives of said may for a next range of LBAs after a...”

Replace “may” with “array”

Claim 19, line 26: “prises a fifth write related operation, end wherein said fifth”

Replace “end” with “and”

Signed and Sealed this
Nineteenth Day of January, 2016

Michelle K. Lee
*Director of the United States Patent and Trademark Office*